United States Patent [19]

Jones et al.

[11] Patent Number: 5,567,993
[45] Date of Patent: Oct. 22, 1996

[54] PROGRAMMABLE POWER SUPPLY SYSTEM AND METHODS

[75] Inventors: Brian W. Jones, Richardson; Alan M. Morton, Dallas, both of Tex.

[73] Assignee: Dallas Semiconductor Corporation, Dallas, Tex.

[21] Appl. No.: 264,389

[22] Filed: Jun. 23, 1994

[51] Int. Cl.$^6$ ................................... H02J 3/14
[52] U.S. Cl. .................. 307/43; 307/23; 307/29; 307/64; 307/65; 307/66; 363/19; 363/21
[58] Field of Search ................. 307/43, 64, 29, 307/23, 65, 66; 363/19, 21

[56] References Cited

U.S. PATENT DOCUMENTS

| | | | |
|---|---|---|---|
| 3,673,576 | 6/1972 | Donaldson, Jr. | 395/725 |
| 3,895,239 | 7/1975 | Alaspa | 307/272.3 X |
| 4,013,902 | 3/1977 | Payne | 307/272.3 |
| 4,034,348 | 7/1977 | Rathbun | 364/900 |
| 4,365,291 | 12/1982 | Zanchi et al. | 364/200 |
| 4,500,953 | 2/1985 | Takezoe et al. | 364/200 |
| 4,571,602 | 2/1986 | DeSchamphehere et al. | 346/160 |
| 4,571,603 | 2/1986 | Hornbeck et al. | 346/160 |
| 4,591,745 | 5/1986 | Shen | 307/592 |
| 4,633,107 | 12/1986 | Norsworthy | 307/594 |
| 4,638,175 | 1/1987 | Bradford et al. | 307/64 |
| 4,663,730 | 5/1987 | Ikeda | 364/900 |
| 4,670,676 | 6/1987 | Nishitani | 307/592 |
| 4,797,584 | 1/1989 | Aguti et al. | 307/272.3 X |
| 4,812,679 | 3/1989 | Mahabadi | 307/272.3 X |
| 4,818,904 | 4/1989 | Kobayashi | 307/594 |
| 4,874,965 | 10/1989 | Compardo et al. | 307/272.3 |
| 4,885,476 | 12/1989 | Mahabadi | 307/272.3 X |
| 4,886,984 | 12/1989 | Nakaoka | 307/272.3 X |
| 4,900,950 | 2/1990 | Dubujet | 307/272.3 X |
| 4,902,907 | 2/1990 | Haga et al. | 307/272. 3 X |
| 4,931,985 | 6/1990 | Glaise et al. | 364/900 |
| 4,953,077 | 8/1990 | Alvarez, II et al. | 395/550 |
| 4,970,418 | 11/1990 | Masterson | 395/550 |
| 5,019,966 | 5/1991 | Saito et al. | 395/775 |
| 5,057,697 | 10/1991 | Hammond et al. | 307/66 |
| 5,081,701 | 1/1992 | Silver | 395/325 |
| 5,184,025 | 2/1993 | McCurry et al. | 307/66 |

OTHER PUBLICATIONS

Dallas Semiconductor Data Book, DS1215 and DS1217 data sheets, 1987–88.
The TTL Data Book, Texas Instruments, Inc, pp. 7–460 to 7–464, 1980–81.

*Primary Examiner*—William M. Shoop, Jr.
*Assistant Examiner*—Albert W. Paladini
*Attorney, Agent, or Firm*—Jenkens & Gilchrist, P.C.

[57] ABSTRACT

A programmable power controller for controlling power between a primary power source and a second power source and powering first circuitry, each of which has a voltage, comprises a control register having a first field, which is used to activate circuitry used to direct power from the primary power source to the second power source, and circuitry to compare the first voltage and the second voltage to determine which is greater and then coupling the primary power source or the second power source depending upon which is greater to power the first circuitry. The control register also has a second field used to select an electrical path having a first voltage drop that ensures the primary power source will have a higher voltage when the primary power source is active under normal operating conditions and a third field used to select an electrical path of a plurality of electrical paths, each electrical path having a variety of voltage drops and resistances. The second power source is preferably chargeable, such as a capacitor or a rechargeable battery.

5 Claims, 9 Drawing Sheets

DS1302
8-PIN DIP (300 MIL)

FIG. 4A

DS1302S 8-PIN SOIC (200 MIL)
DS1302Z 8-PIN SOIC (150 MIL)

| FUNCTION | BYTE N | SCLK n |
|---|---|---|
| CLOCK | 8 | 72 |
| RAM | 31 | 256 |

REGISTER ADDRESS
A. CLOCK

REGISTER DEFINITION

| Register | 7 | 6 | 5 | 4 | 3 | 2 | 1 | 0 | Range | | | | |
|---|---|---|---|---|---|---|---|---|---|---|---|---|---|
| SEC | 1 | 0 | 0 | 0 | 0 | 0 | 0 | RD/$\overline{W}$ | 00-59 | CH | 10 SEC | SEC | |
| MIN | 1 | 0 | 0 | 0 | 0 | 0 | 1 | RD/$\overline{W}$ | 00-59 | 0 | 10 MIN | MIN | |
| HR | 1 | 0 | 0 | 0 | 0 | 1 | 0 | RD/$\overline{W}$ | 01-12 / 00-23 | 12/24 | 0 | 10 A/P | HR |
| DATE | 1 | 0 | 0 | 0 | 0 | 1 | 1 | RD/$\overline{W}$ | 01-28/29 01-30 01-31 | 0 | 0 | 10 DATE | DATE |
| MONTH | 1 | 0 | 0 | 0 | 1 | 0 | 0 | RD/$\overline{W}$ | 01-12 | 0 | 0 | 0 | 10 M | MONTH |
| DAY | 1 | 0 | 0 | 0 | 1 | 0 | 1 | RD/$\overline{W}$ | 01-07 | 0 | 0 | 0 | 0 | 0 | DAY |
| YEAR | 1 | 0 | 0 | 0 | 1 | 1 | 0 | RD/$\overline{W}$ | 0-99 | 10 YEAR | YEAR | | |
| CONTROL | 1 | 0 | 0 | 0 | 1 | 1 | 1 | RD/$\overline{W}$ | | WP | 0 | 0 | 0 | 0 | 0 | 0 | 0 |
| TRICKLE CHARGER | 1 | 0 | 0 | 1 | 0 | 0 | 0 | RD/$\overline{W}$ | | TCS | TCS | TCS | TCS | DS | DS | RS | RS |
| CLOCK BURST | 1 | 0 | 1 | 1 | 1 | 1 | 1 | RD/$\overline{W}$ | | | | | |

FIG. 8A

B. RAM

| Register | 7 | 6 | 5 | 4 | 3 | 2 | 1 | 0 |
|---|---|---|---|---|---|---|---|---|
| RAM 0 | 1 | 1 | 0 | 0 | 0 | 0 | 0 | RD/$\overline{W}$ |
| ⋮ | | | | | | | | |
| RAM 30 | 1 | 1 | 1 | 1 | 1 | 1 | 0 | RD/$\overline{W}$ |
| RAM BURST | 1 | 1 | 1 | 1 | 1 | 1 | 1 | RD/$\overline{W}$ |

RAM DATA 0

⋮

RAM DATA 30

FIG. 8B

PROGRAMMABLE POWER SUPPLY SYSTEM AND METHODS

PARTIAL WAIVER OF COPYRIGHT PURSUANT TO 1077 O.G. 22 (Mar. 20, 1987)

(C) Copyright, Dallas Semiconductor Corporation 1994. All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

CROSS-REFERENCE TO RELATED APPLICATIONS

This application hereby incorporates by reference:

| Ser. No./ Patent No. | Filing Date/ Issue Date | DSC No. | Inventors |
| --- | --- | --- | --- |
| 5,148,051 | 09/15/92 | | Kevin Deierling Louis Rodriguez |
| 07/628,691 abandoned | 12/14/90 | | Louis Rodriguez and Kevin Deierling |

BACKGROUND

Primary and secondary power supplies are often used in tandem to power various forms of application circuitry (e.g., timekeeping). Inputs for primary power supplies have typically been electrically coupled to system power sources and inputs for secondary power supplies have been electrically coupled to back-up power supplies (e.g., batteries), neither of which were rechargeable (e.g., rechargeable batteries). The power management circuitry used to control power supplies have not allowed convenient mechanisms or methods that allow users to access and/or recharge batteries that are used as a power supply. As a result, a user's choice has been rather limited. The user could use only the system power supply (e.g., for the first power source) and non-chargeable batteries for the primary and secondary power supplies. Alternatively, if the user insisted on rechargeable batteries, external charging circuitry was required, because necessary circuitry (if it existed at all) could not be easily integrated into an integrated circuit. As referenced above, a reliable power supply is an especially important consideration in time-keeping applications, because users generally want to perpetually save, back-up, and otherwise preserve timekeeping information (e.g., what time is it?). However, it is important in other applications as well.

In addition, adding features to existing product lines introduces additional factors, such as compatibility issues. New generations of parts are preferably compatible with previous generations of parts. As a result, new features, such as those discussed above, need to be able to be added to or integrated with existing systems without altering the basic functionality or operation of previous generations of electrical devices (e.g., integrated circuits). For instance, when there are a limited number of pins, one simply cannot add an extra pin to invoke or activate the newly added feature. Thus, it complicates the addition of new features without affecting the basic functionality.

SUMMARY OF THE INVENTIONS

A programmable power controller controls power between a first power source (e.g., a primary power source or system power source, which is typically non-rechargeable) and a second power source (e.g., a secondary power source or a back-up power supply, such as a battery or capacitor that can be charged up). First and second power sources have a first voltage and second voltage respectively. The first and second power sources are preferably used to independently power first circuitry. Circuitry is used to compare the first voltage and the second voltage to determine which is greater and then to couple first power source or second power source depending upon which is greater to power the first circuitry.

A control register has a first field that is used to activate circuitry that directs power from first power source to the second power source. The control register also has a second field used to select an electrical path having a first voltage drop that ensures first power source will have a higher voltage than the second power source when first power source is active under normal operating conditions. Diodes are preferably used to provide the necessary voltage drops. The control register also has a third field used to select an electrical path from a plurality of electrical paths, each electrical path having an unique series resistance. The electrical path governed by the second field preferably incorporates at least one diode. The electrical paths governed by the third field have different resistance. The second power source may be chargeable. The circuitry used to implement the conductive paths constitutes a trickle charger. However, if the second power source is not rechargeable, the trickle charger can be bypassed, so that preferred embodiments are compatible with previous generations of products that lack a trickle charger and/or do not use a chargeable power source for the second power source. Preferred embodiments have three electrical paths governed by the third field with the following resistances: 2KΩ, 4KΩ, and 8KΩ. In addition, preferred system embodiments allow the user to activate the programmable power supply system and to select the type of first and/or second power supply which is connected to the circuit via a first and second pin. This circuit adds the additional capability for second power sources that are rechargeable, such as rechargeable batteries or large capacitors known as "super caps".

There are numerous advantages of the preferred embodiment discussed below. In particular, preferred embodiments only require two pins for operation. In addition, the disclosed charging scheme is simple enough that it provides continuous charging of back-up supply while the primary power source remains connected and is at an adequate voltage. Similarly, the charging scheme allows user flexibility in setting both charging current and voltage. The diode drop(s) also ensure that the charged supply will always have a smaller voltage than the charging supply so that the comparator that determines which supply is connected to the circuit makes the proper decision when the charging supply has sufficient voltage. Preferred embodiments also allow users to connect either rechargeable batteries or large capacitors, which are known as "super caps", to supply power to the integrated circuit (e.g., the serial timekeeping chip). In addition, preferred embodiments also provide a protection against the charging of non-rechargeable power supplies by defaulting to the dual power supply mode. Finally, no external circuits are required.

The advantages recited above are important, because they can be extended to other parts and other applications. In particular, depending on the normal operating voltage, any number of diode drops could be available to the user by adding more register bits and the appropriate decode. Similarly, depending on the current requirements, any number of different value resistors could be made available to the user by adding more register bits and the appropriate decode. In addition, the level of security against accidental enabling of the charger could be improved by adding more bits in the control register that allows this operation. Since only one code would enable the charger, the probability would be reduced as the number of bits gets larger. Likewise, the control bits could be of EEPROM type that get initialized at power-up so as to configure the power supply function of the i.c. that the user desires. A capacitor could also be integrated onto the integrated circuit to be a redundant back-up supply so that the user could disconnect the rechargeable power supply from the integrated circuit pin and still have enough back-up power to save memory registers. This is useful in replacing worn-out rechargeable batteries.

BRIEF DESCRIPTION OF THE DRAWINGS

Further features and advantages will become apparent from the following and more particular description of the various embodiments of the invention, as illustrated in the accompanying drawings, wherein.

DETAILED DESCRIPTION OF THE PREFERRED EMBODIMENTS

Figure 1:
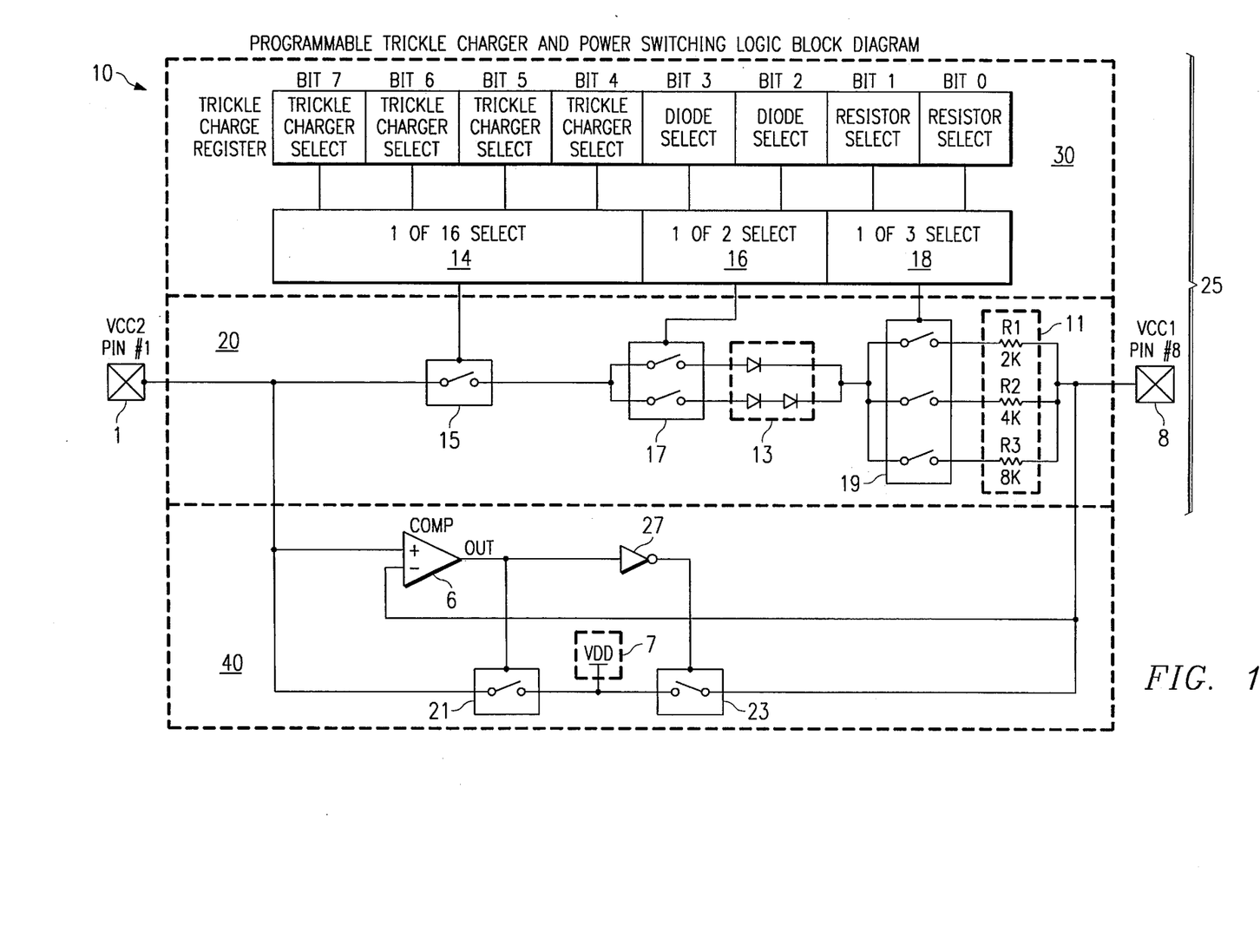
FIG. 1 is block diagram of the programmable power supply system 10 (e.g., trickle charger)

FIG. 1 is block diagram of programmable power supply system 10 (e.g., trickle charger). The programmable power supply system 10 shown in FIG. 1 is comprised of two general blocks: power control block 25 (e.g., that implements the trickle charger) and power switch block 40. Power control block 25 is preferably comprised of multiple power control block 20 (see FIG. 2A for a preferred embodiment) and power supply control register block 30 (e.g., trickle charge register) (see FIG. 2B for a preferred embodiment). The preferred implementation of power switch block 40 is shown in FIG. 3A.

Regarding the operation of programmable power supply system 10, programmable power supply system 10 automatically initializes itself for operation as a dual power supply system. First pin 1, which is also labeled $V_{cc}2$ and pin #1 in FIG. 1, and second pin 8, which is also labeled $V_{cc}1$ and pin #8 in FIG. 1, are electrically coupled to the programmable power supply system 10 shown in FIG. 1 as well as the rest of the integrated circuit (e.g., timekeeping circuitry—see FIGS. 5A and 5B). Note the numbers assigned to first pin 1 and second pin 8 correspond to the actual pin assignments of a preferred embodiment of an application of the disclosed invention (see FIGS. 4A and 4B). First pin 1 is preferably electrically coupled to first power supply (e.g., $V_{cc}2$). Second pin 8 is preferably electrically coupled to a second power supply (e.g., $V_{cc}1$), such as a rechargeable battery (e.g., rechargeable Lithium, NiCd, NMH). Multiple power control block 20 of programmable power supply system 10 enables second power supply to be charged in a trickle charge fashion.

Circuit comparator 6 in conjunction with switch blocks 21 and 23 and inverter 27 determine whether first power supply (which is inputted via pin 1—the $V_{cc}2$ hook-up) or second power supply (which is inputted via pin 8—the $V_{cc}1$ hook-up) has the largest voltage and electrically couples the supply having the largest voltage to the application circuitry through the $V_{DD}$ node 7. In light of the fact the application circuitry may perform virtually any function, the circuitry is not immediately shown in great detail in FIG. 1. However, circuitry powered in a preferred application (e.g., timekeeping circuitry) is shown in subsequent figures and described below. In addition, note that the resulting impedance of the diode combination 13 (which exist independently from one another or are taken in combination) and the resistor array 11 (which exist independently from one another or are taken in combination) ensures that the voltage corresponding to second power source (e.g., $V_{cc}1$) is lower than the voltage corresponding to first power source, so that the circuit comparator 6 will determine that first power source is higher and the surrounding circuitry (switch blocks 21 and 23 and inverter 27) will couple the first power supply to the application circuitry in normal operation. This will change when first power source drops below a preselected range (e.g., namely the voltage drop associated with the programmed impedance between pin 1 and pin 8). Power supply represented by $V_{cc}2$, which is electrically coupled to the programmable power supply system 10 through pin 1, supplies the necessary current to run circuit comparator 6 (and any additional comparators) that determines which of the two power supplies should be electrically coupled to the application circuitry (e.g., timekeeping) via node $V_{DD}$. Power supplies represented by $V_{cc}1$ and $V_{cc}2$ supply the necessary current to power circuitry during an access to the internal registers as well as to power circuitry that must remain active at all times (e.g., clock registers). As a result, the power supply chosen typically consumes more power than the other power supply. However, if $V_{cc}2$ is present, it will generally consume more than $V_{cc}1$ in preferred embodiments, because of the comparator current.

Programmable power supply system 10, which is also called the dual supply system, is preferably programmed or initialized via control register block 30 (e.g., trickle charge register). Control register block 30 is preferably initialized by power-on reset circuitry 31, which is shown in FIG. 2E. Control register block 30 (and, thus, multiple power control block 20) preferably naturally powers-up in a state that disables circuitry comprised in the multiple power control block 20 powered via node $V_{DD}$, SO that the application circuitry (not shown) is compatible with existing embodiments of the application circuitry. In other words, the user must instruct, activate, or program multiple power control block 20 via control register block 30. The inherent, preset, or default state does not automatically initiate this feature. This is important, because it allows the application circuitry (not shown) to be compatible with alternate embodiments of application circuitry that do not also utilize power control block 25.

Figure 2A:
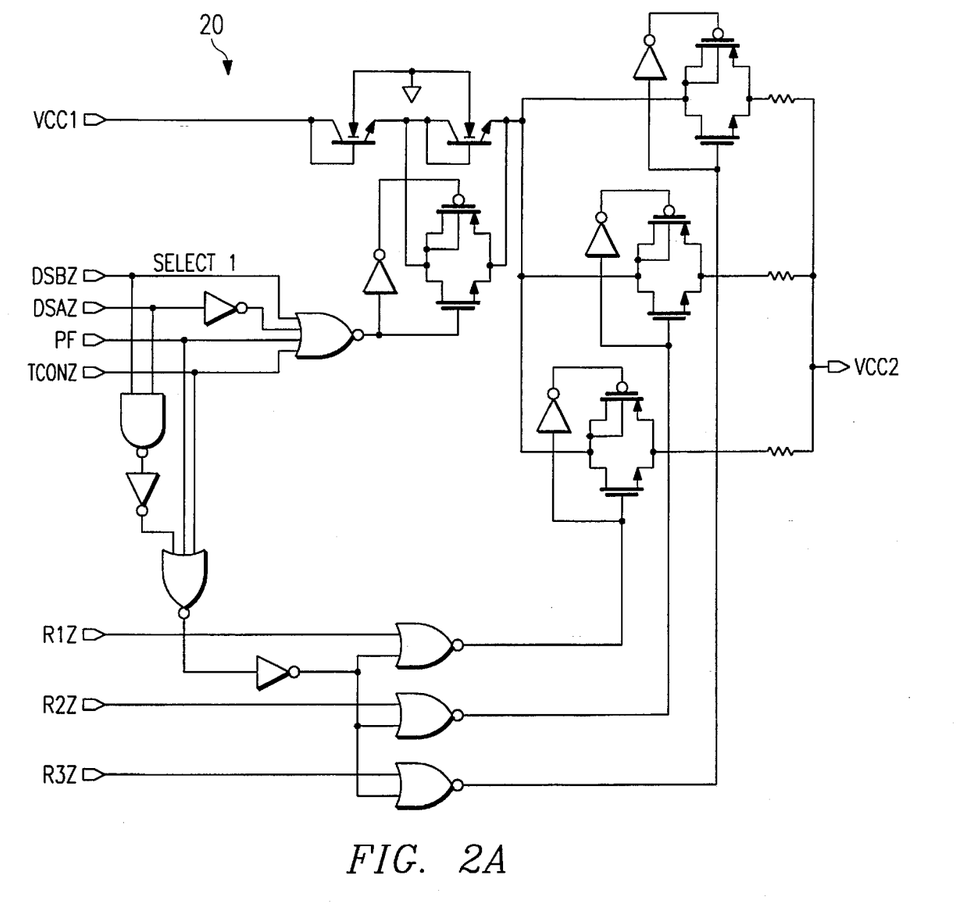
FIG. 2A is a schematic implementing multiple power control block 20 (e.g., trickle charger) of the overall block diagram of the programmable power supply system 10 that is shown in FIG. 1.
Figure 3A:
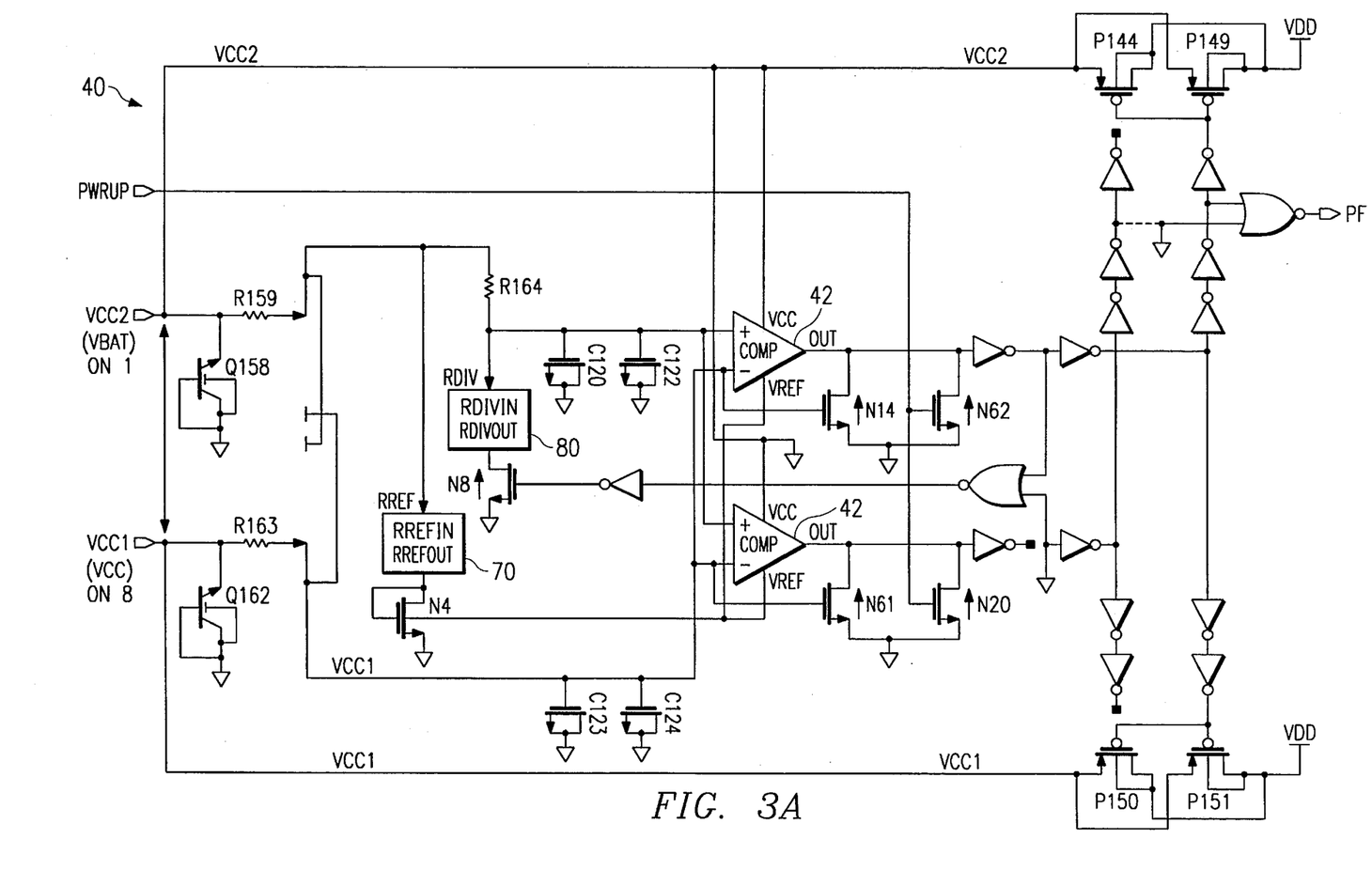
FIG. 3A is a schematic implementing power switch block 40 of the overall block diagram of the programmable power supply system 10 that is shown in FIG. 1.

In other words, as shown in FIG. 1 and FIG. 2A, control register block 30, which is preferably 8 bits, sets the characteristics of the charging circuit and will be described later. If the user only wants to work in the default mode described above, he does not ever have to access control register block 30 to configure programmable power supply system 10. As a result, circuitry shown in FIG. 1 will then work to connect the supply with the largest voltage to the internal circuitry as have previous circuitry on products on which the circuitry described herein is preferably implemented, such as the DS2404, which is manufactured by Dallas Semiconductor Corporation and described in their data book. As a result, the disclosed circuitry and added features are completely compatible with existing versions or forms of the application circuitry.

As discussed above, control register block 30 sets the characteristics of multiple power control block 20. Multiple power control block 20 is comprised of circuitry used to trickle charge the rechargeable power supply, which functions as second power source (e.g., batteries or super capacitors) coupled to the circuitry shown in FIG. 1 via $V_{cc}1$ pin. As mentioned above, control register block 30 has built in features to assure that charger circuitry are not activated unless the user sets the proper bits, which ensures the default compatibility condition described above. In particular, there are a plurality of fields (e.g., three) of bits that make up the 8-bit control register block 30. First field 14 consists of 4-bits that are used to enable charger. A preselected number of codes (e.g., one) or combination of bits will enable the charger; all other remaining codes are preferably invalid and disable charger circuitry. Second and third fields 16 and 18 set the electrical characteristics of charger circuitry. Only a valid code in all three fields 14, 16, and 18 will enable charger circuitry. Also, all of the bits of control register block 30 are preferenced or biased to select a code which will disable charger circuitry upon the initial application of power to overall circuitry (including the circuitry shown in FIG. 1).

More specifically, control register block 30 controls the charge characteristics of the overall charge circuitry. Charger select (TCS) bits 14 (bits 4–7) control the selection or activation of charger circuitry via switch block 15. In order to prevent accidental enabling, only a pattern of 1010 will enable charger circuitry. As discussed above, all other patterns will disable the charger. Diode select (DS) bits 16 (bits 2–3) select whether the path having one diode or the path having two diodes in the diode combination 13 are electrically coupled between first and second power sources electrically coupled to the circuitry via $V_{cc}2$ and $V_{cc}1$ pins via switch block 15. If DS is 01, the path having one diode is selected. Alternatively, if DS is 10, the path having two diodes are selected. If DS is 00 or 11, the charger is disabled independent of the status of TCS. Resistor select (RS) bits 18 (bits 0–1) select the specific resistor (e.g., 2K Ω, 4K Ω, or 8K Ω) to be electrically coupled between first and second power sources. If RS is 00, no resistor is selected and the charger is disabled independent of the status of TCS. If RS is 01, the 2k Ω resistor is selected to be electrically coupled between pins 1 and 8. If RS is 10, the 4k Ω resistor is selected to be electrically coupled between pins 1 and 8. If RS is 11, the 8k Ω resistor is selected to be electrically coupled between pins 1 and 8.

Note that the number of diodes may differ, so long as alternate paths exist that have differing numbers of diodes. Similarly, the number of resistors and/or actual values of each resistor may vary depending upon the trickle charge requirements (e.g., voltage, current, etc.) of second power source (e.g., the rechargeable battery or super capacitor). This is important in light of the differing chemistries of different rechargeable batteries. Preferred embodiments are flexible enough to take this into account. In particular, in preferred embodiments, diode and resistor selection is determined by the user according to the maximum current desired for the battery or super cap charging. The maximum current can be calculated as illustrated in the following example. Assuming that a system power supply of 5 V is electrically coupled to pin 1 and a super cap is connected to pin 8 and assuming that the charger has been enabled with 1 diode and the 2k Ω resistor electrically coupled between the two pins, the maximum current $I_{max}$ would therefore be calculated as follows:

$$\begin{aligned} I_{max} &= (5.0 \text{ V} - \text{diode drop})/R \\ &\sim (5.0 \text{ V} - 0.7 \text{ V})/2k\Omega \\ &\sim 2.2 \text{ mA} \end{aligned}$$

Obviously, as the battery or super cap charges, the voltage drop between the two power pins 1 and 8 will decrease and therefore the charge current will decrease.

Regarding charger operation, the overall circuitry, which is preferably implemented on an integrated circuit, can be configured to have a dual power supply system that will accept first power connection and a second power supply connection via pins 1 and 8. This configuration allows the user to connect rechargeable batteries as well as large capacitors (e.g., 100 micro-FarAds to one Farad) known as "super caps" to provide the power for the application circuitry. This operation is controlled by control register block 30 in the manner described above.

Figure 2B:
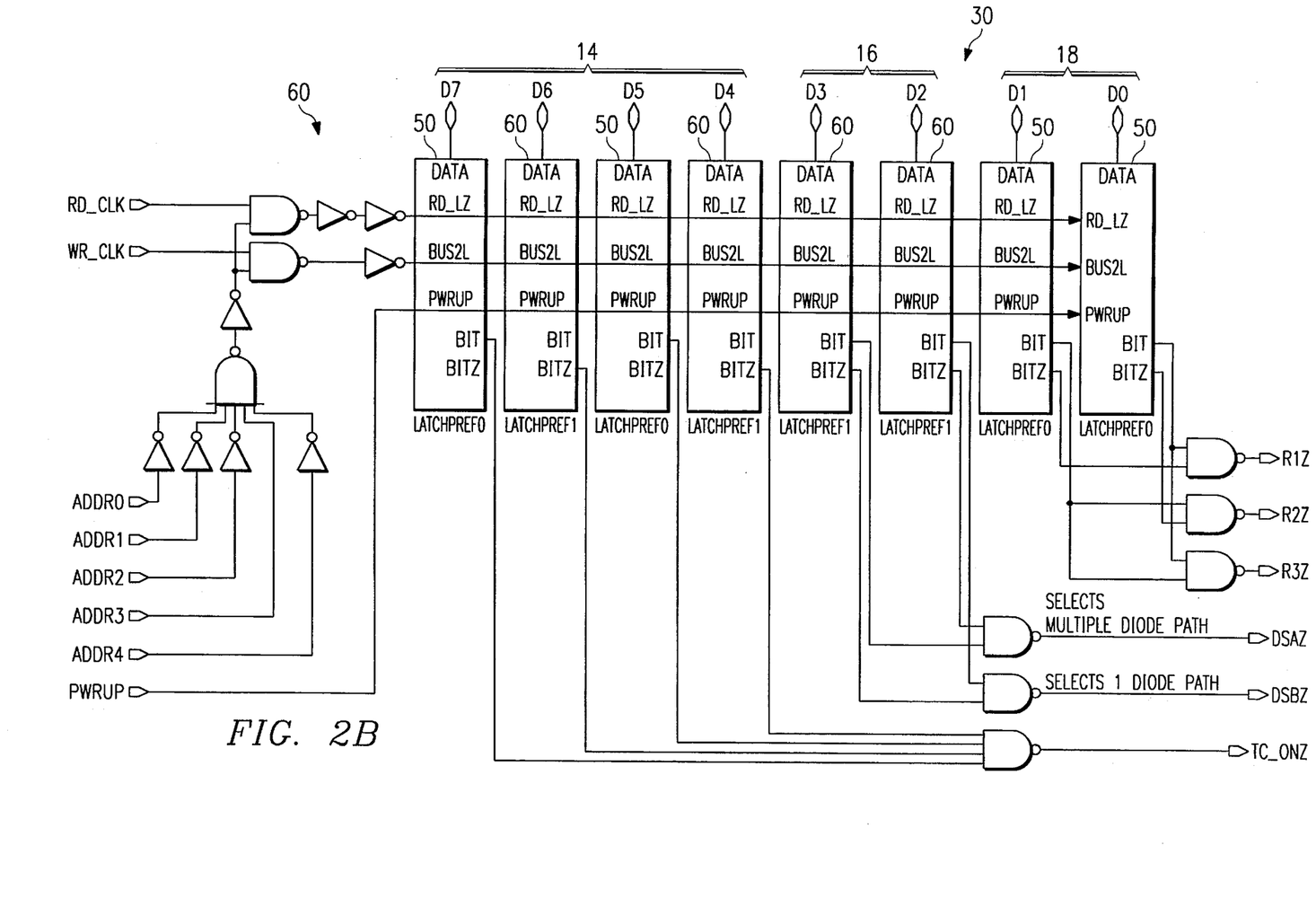
FIG. 2B is a schematic implementing power supply control register block 30 (e.g., trickle charge register) of the overall block diagram of the programmable power supply system 10 that is shown in FIG. 1.
Figure 2C:
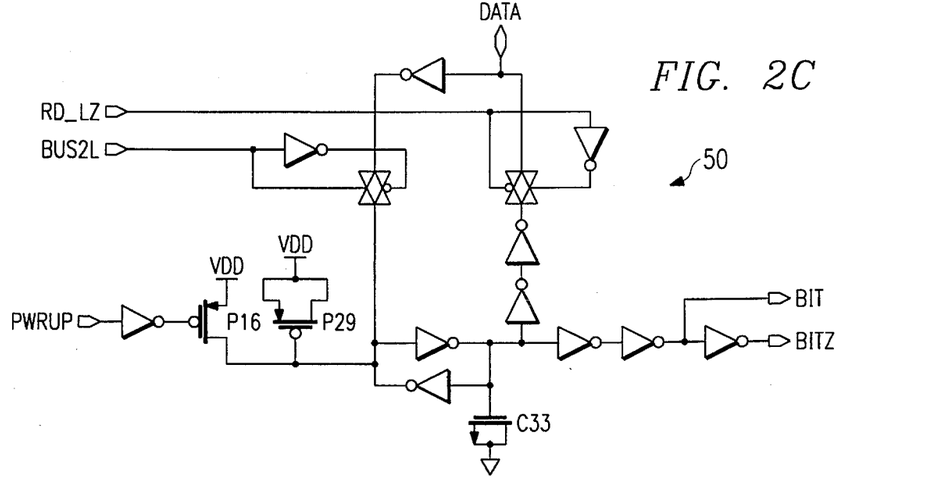
FIGS. 2C and 2D are schematics implementing latchpref0 blocks 50 and latchpref1 blocks 60 respectively of the schematic of power supply control register block 30 shown in FIG. 2B.
Figure 2D:
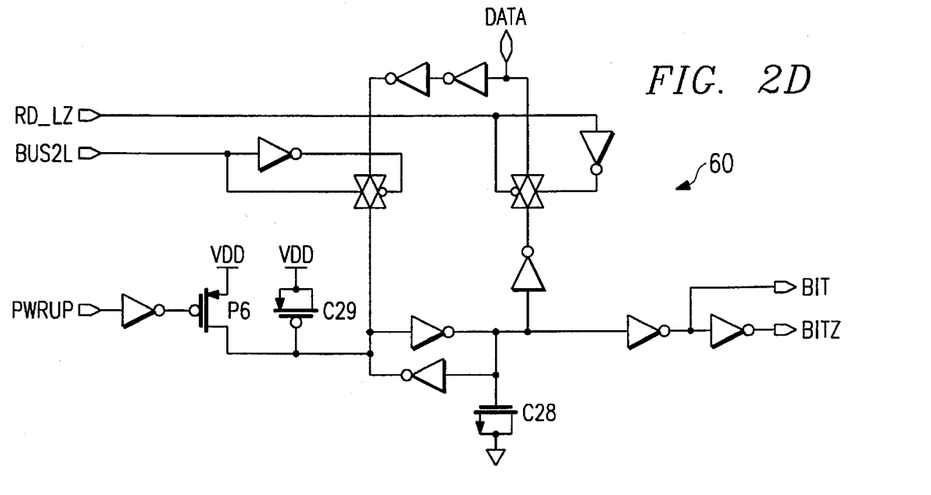
Figure 2E:
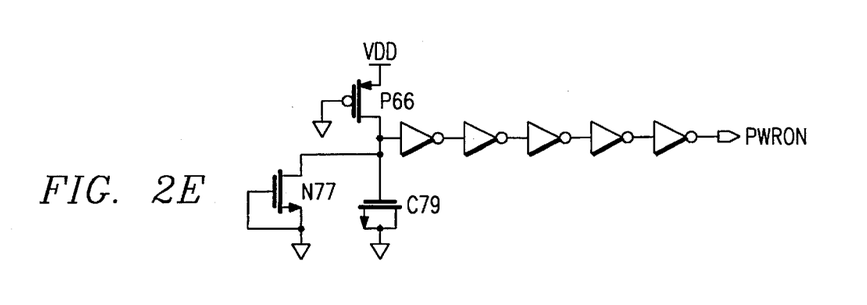
FIG. 2E is a schematic of power-on reset circuitry 31, which initializes control register block 30 in FIG. 1.

FIG. 2A is a schematic implementing multiple power control block 20 (e.g., trickle charger) of the overall block diagram of the programmable power supply system 10 that is shown in FIG. 1. FIG. 2B is a schematic implementing power supply control register block 30 (e.g., trickle charge register) of the overall block diagram of the programmable power supply system 10 that is shown in FIG. 1. FIGS. 2C and 2D are schematics implementing latchpref0 blocks 50 and latchpref1 blocks 60 respectively of the schematic of power supply control register block 30 shown in FIG. 2B and are self-explanatory. Latchpref0 blocks 50 and latchpref1 blocks 60 latch or hold the data bit information described above and, thus, collectively form control register block 30. Please note that preferred embodiments only use two diodes for diode combination 13, as opposed to three diodes, as shown in FIG. 1. Circuitry in addition to switching circuitry 17 is used to insure that the respective conductive paths having one diode or two diodes are coupled together accordingly. In other words, preferred embodiments use only two diodes, instead of three, and couple them together in series to implement the conductive path having two diodes and decouple them to implement the conductive path having only one diode. This feature saves dedicated circuitry and the corresponding area in the final system, which is preferably implemented on an integrated circuit.

Figure 3B:
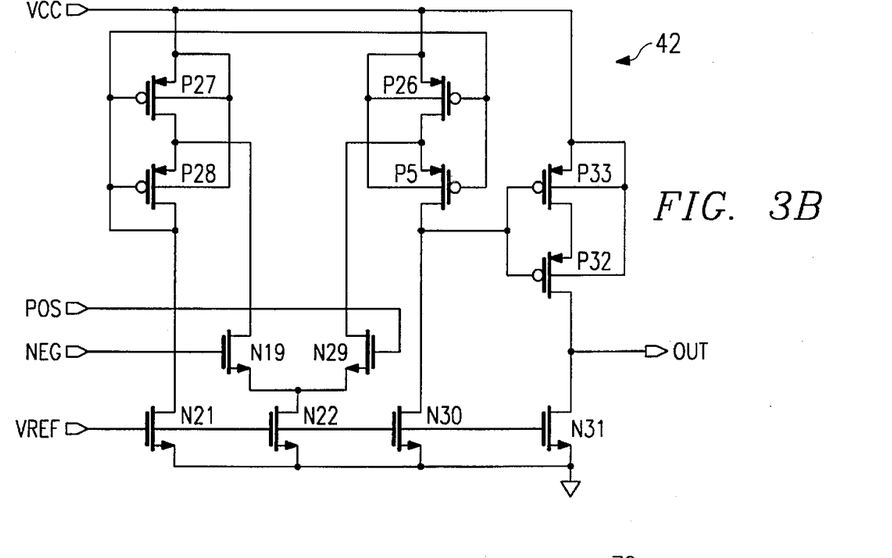
FIGS. 3B is a schematic implementing comparator 42 of power switch block 40 shown in FIG. 3A.
Figure 3C:
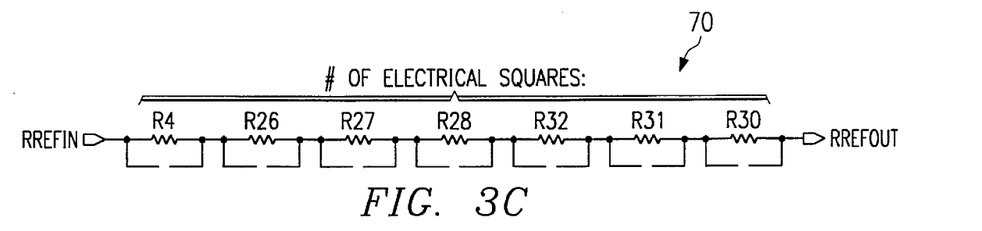
FIGS. 3C is a schematic implementing RRef block 70 of power switch block 40 shown in FIG. 3A.
Figure 3D:
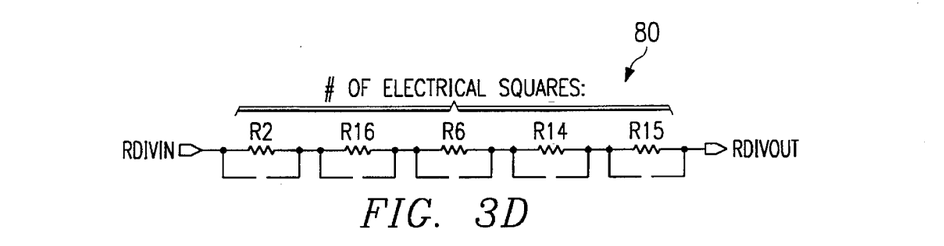
FIGS. 3D is a schematic implementing RDiv block 80 of power switch block 40 shown in FIG. 3A.

Similarly, FIG. 3A is a schematic implementing power switch block 40 of the overall block diagram of the programmable power supply system 10 that is shown in FIG. 1. FIG. 3B is a schematic implementing comparator 42 of power switch block 40 shown in FIG. 3A. FIG. 3C is a schematic implementing RRef block 70 of power switch block 40 shown in FIG. 3A. FIG. 3D is a schematic implementing RDiv block 80 of power switch block 40 shown in FIG. 3A.

As mentioned above, preferred embodiments of the power control circuitry are generally implemented in timekeeping integrated circuits, such as that described in the patents and/or patent applications incorporated above or serial timekeeping circuits manufactured by Dallas Semiconductor Corporation, the assignee in this case.

Preferred serial timekeeping circuits preferably have the following general features: real time clock counts seconds, minutes, hours, date of the month, month, day of the week, and year with leap year compensation; 31×8 RAM for scratchpad data storage, 2.5–5.5 volt full operation; optional 2.0–5.5 volt full operation also available; uses less than 300 nA at 2.5 volts; single-byte or multiple-byte (burst mode) data transfer for read or write of clock or RAM data; 8-pin DIP or optional 8-pin SOIC's for surface mount; Simple 3-wire interface; TTL-compatible ($V_{cc}$=5 V); Optional industrial temperature range –40° C. to +85° C.; compatible with previous generations of parts (e.g., DS1202, which is manufactured by Dallas Semiconductor Corporation). In addition, the above capability allows the following additional features: optional trickle charge capability to $V_{cc1}$; dual power supply pins for first and backup power supplies; and backup power supply pin can be used for battery or super cap input.

Figure 4A:
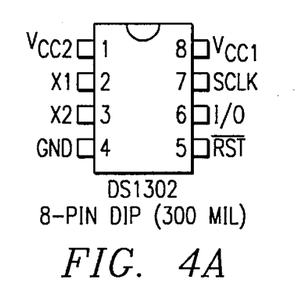
FIGS. 4A and 4B are examples of preferred embodiments of the preferred system application of the above circuitry showing the preferred pin assignments.
Figure 4B:
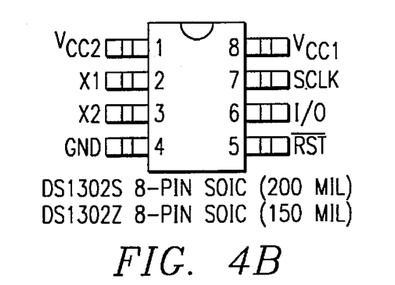

Preferred embodiments of the preferred system application of the above circuitry have the pins shown in FIGS. 4A and 4B and the following pin descriptions:

| PIN DESCRIPTION | |
| --- | --- |
| X1, X2 | 32.768 kHz Crystal Pins |
| GND | Ground |
| RST | Reset |
| I/O | Data Input/Output |

-continued

| PIN DESCRIPTION | |
| --- | --- |
| SCLK | Serial Clock |
| $V_{cc}1$, $V_{cc}2$ | Power Supply Pins |

In addition, preferred system applications contain a real time clock/calendar and 31 bytes of static RAM. It communicates with a microprocessor via a simple serial interface. The real time clock/calendar provides seconds, minutes, hours, day, date, month, and year information. The end of the month date is automatically adjusted for months with less than 31 days, including corrections for leap year. The clock operates in either the 24-hour or 12-hour format with an AM/PM indicator. Interfacing preferred system applications with a microprocessor is simplified by using synchronous serial communication. Only three wires are required to communicate with the clock/RAM: (1) RST (Reset), (2) I/O (Data line), and (3) SCLK (Serial clock). Data can be transferred to and from the clock/RAM one byte at a time or in a burst of up to 31 bytes. Preferred system applications are designed to operate on very low power and retain data and clock information on less than 1 microwatt. As mentioned above, the circuitry discussed above provides additional features of dual power pins for first and backup power supplies, and programmable trickle charger for $V_{cc}1$,

OPERATION

Figure 5A:
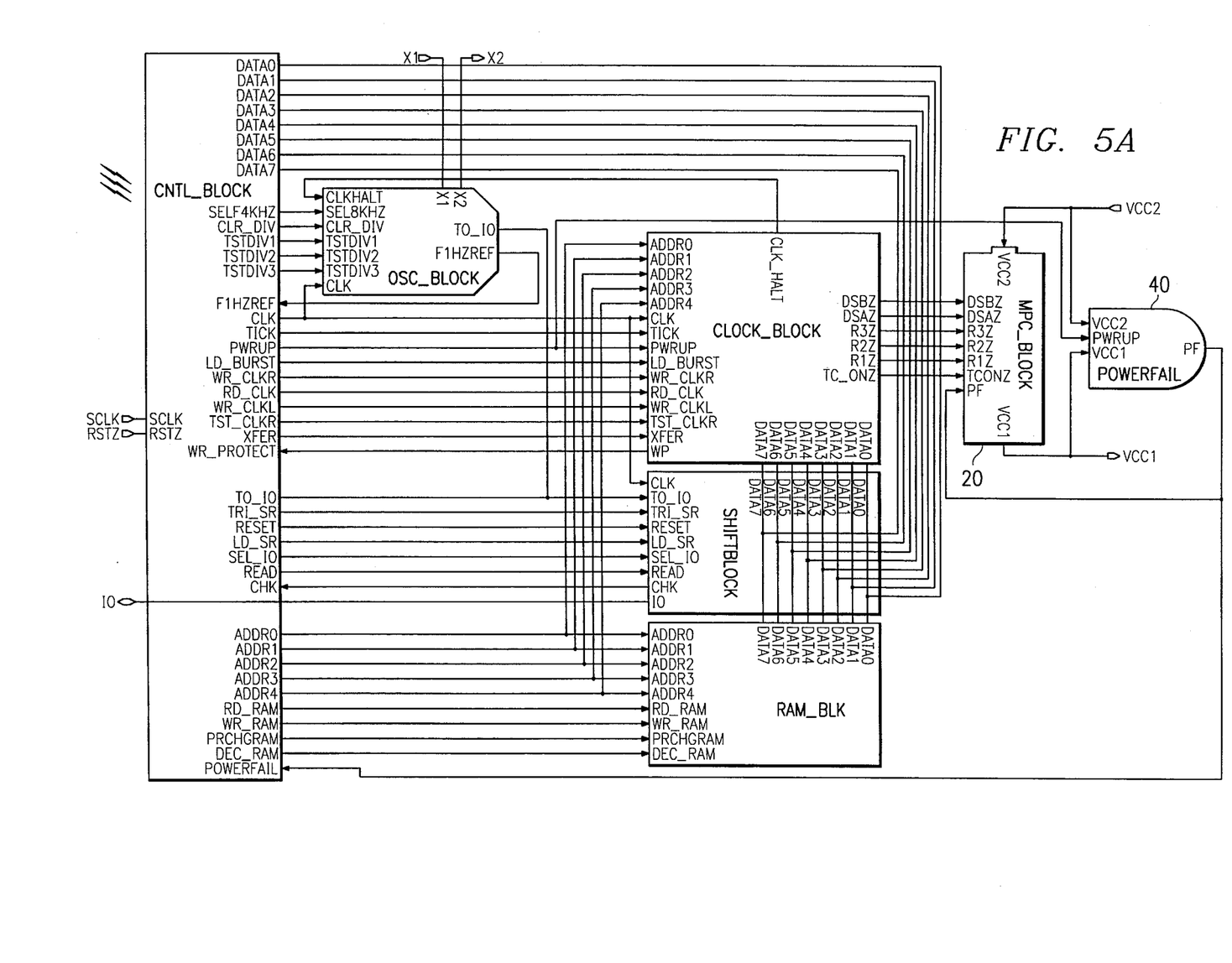
FIG. 5A is a block diagram of the preferred system application referenced in FIGS. 4A and 4B.
Figure 5B:
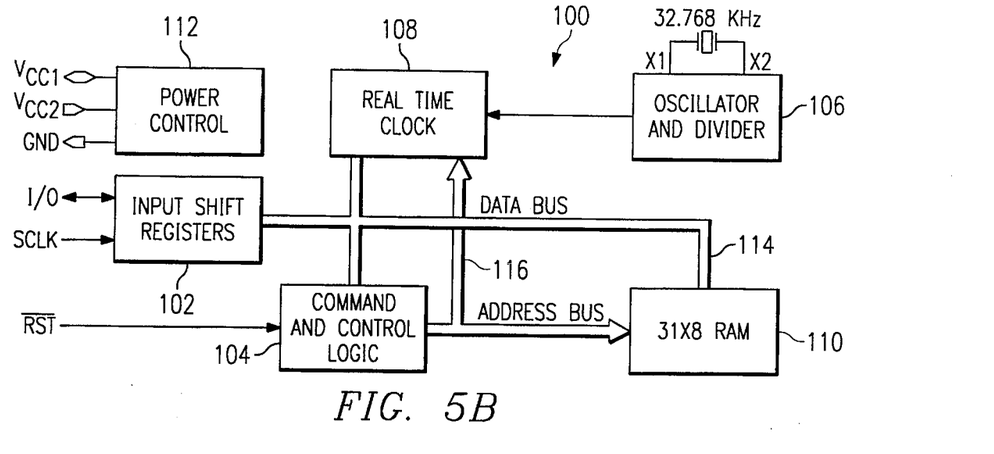
FIG. 5B is a block diagram of the preferred system application, referenced in FIGS. 1–4B.

The main elements of the Serial Timekeeper are shown in FIGS. 5A and 5B, which is the preferred system application referenced in FIGS. 3A and 3B. The Serial Timekeeper is preferably comprised of shift register 102, control logic 104, oscillator 106, real time clock 108, and RAM 110 along with data bus 114 and address bus 116. Power control circuitry 112 was described above and will be described below. To initiate any transfer of data, $\overline{RST}$ is taken high and eight bits are loaded into the shift register providing both address and command information. Data is serially input on the rising edge of the SCLK. The first eight bits specify which of 40 bytes will be accessed, whether a read or write cycle will take place, and whether a byte or burst mode transfer is to occur. After the first eight clock cycles have loaded the command word into the shift register, additional clocks will output data for a read or input data for a write. The number of clock pulses equals eight plus eight for byte mode or eight plus up to 248 for burst mode.

COMMAND BYTE

Figure 6:
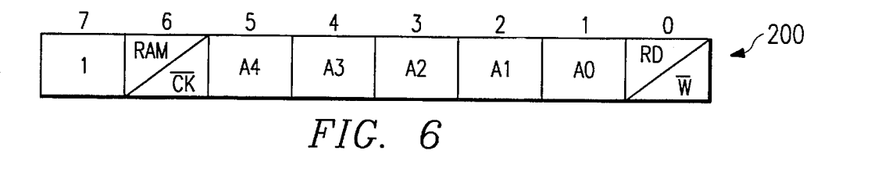
FIG. 6 is a block diagram of the address/command byte 200.

FIG. 6 is a block diagram of the address/command byte 200. Each data transfer is initiated by a command byte. The MSB (Bit 7) must be a logic 1. If it is zero, writes to preferred system embodiments will be disabled. Bit 6 specifies clock/calendar data if logic 0 or RAM data if logic 1. Bits one through five specify the designated registers to be input or output, and the LSB (Bit 0) specifies a write operation (input) if logic 0 or read operation (output) if logic 1. The command byte is always input starting with the LSB (bit 0).

RESET AND CLOCK CONTROL

All data transfers are initiated by driving the $\overline{RST}$ input high. The $\overline{RST}$ input serves two functions. First, $\overline{RST}$ turns on the control logic which allows access to the shift register for the address/command sequence. Second, the $\overline{RST}$ signal provides a method of terminating either single byte or multiple byte data transfer.

A clock cycle is a sequence of a falling edge followed by a rising edge. For data input, data must be valid during the rising edge of the clock and data bits are output on the falling edge of clock. If the $\overline{\text{RST}}$ input is low all data transfer terminates and the I/O pin goes to a high impedance state. Data transfer is illustrated in FIG. 3. At power-up, $\overline{\text{RST}}$ must be a logic 0 until $V_{cc} \geq 2.5$ volts. Also SCLK must be at a logic 0 when $\overline{\text{RST}}$ is driven to a logic 1 state. $V_{cc}$ is defined as whichever the $V_{cc}1$ and $V_{cc}2$ is powering the preferred system embodiment.

DATA INPUT

Following the eight SCLK cycles that input a write command byte, a data byte is input on the rising edge of the next eight SCLK cycles. Additional SCLK cycles are ignored should they inadvertently occur. Data is input starting with bit 0.

DATA OUTPUT

Following the eight SCLK cycles that input a read command byte, a data byte is output on the falling edge of the next eight SCLK cycles. Note that the first data bit to be transmitted occurs on the first falling edge after the last bit of the command byte is written. Additional SCLK cycles retransmit the data bytes should they inadvertently occur so long as $\overline{\text{RST}}$ remains high. This operation permits continuous burst mode read capability. Also, the I/O pin is tri-stated upon each rising edge of SCLK. Data is output starting with bit 0.

BURST MODE

Burst mode may be specified for either the clock/calendar or the RAM registers by addressing location 31 decimal (address/command bits one through five=logical one). As before, bit six specifies clock or RAM and bit 0 specifies read or write. There is no data storage capacity at locations 9 through 31 in the Clock/Calendar Registers or location 31 in the RAM registers. Reads or writes in burst mode start with bit 0 of address 0.

As in the case with preferred system embodiments, which is the prior embodiment of the preferred application circuitry referenced above, when writing to the clock registers in the burst mode, the first eight registers must be written in order for the data to be transferred. However, when writing to RAM in burst mode it is not necessary to write all 31 bytes for the data to transfer. Each byte that is written to will be transferred to RAM regardless of whether all 31 bytes are written or not.

CLOCK/CALENDAR

Figure 8A:
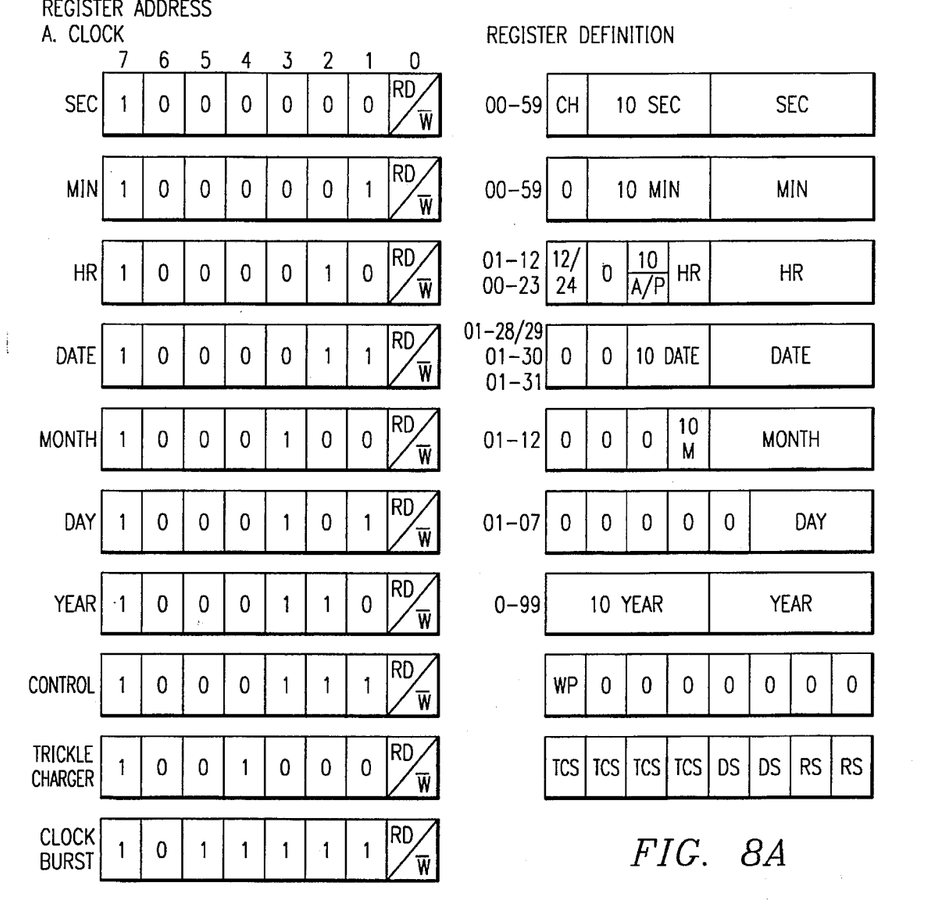
FIGS. 8A and 8B show the register address/definition for the clock and ram modes.

The clock/calendar is contained in seven write/read registers as shown in FIG. 8A. Data contained in the clock/calendar registers is in binary coded decimal format (BCD).

CLOCK HALT FLAG

Bit 7 of the second register is defined as the clock halt flag. When this bit is set to logic 1, the clock oscillator is stopped and preferred applications are placed into a low-power standby mode with a current drain of less than 100 nanoamps. When this bit is written to logic 0, the clock will start.

AM-PM/12–24 MODE

Bit 7 of the hours register is defined as the 12-or 24-hour mode select bit. When high, the 12-hour mode is selected. In the 12-hour mode, bit 5 is the AM-PM bit with logic high being PM. In the 24-hour mode, bit 5 is the second 10 hour bit (20–23 hours).

WRITE PROTECT REGISTER

Bit 7 of write protect register is the write protect bit. The first seven bits (bits 0–6) are forced to zero and will always read a zero when read. Before any write operation to the clock or RAM, bit 7 must be zero. When high, the write protect bit prevents a write operation to any other register.

TRICKLE CHARGE REGISTER

Referring to FIG. 1 again, control register block 30 controls the trickle charge characteristics of preferred system embodiment. While FIG. 1 was described above, relevant portions of the description will be added here for completeness and to explain how it interacts with preferred forms of application circuitry. The trickle charge select (TCS) bits (bits 4–7) control the selection of the trickle charger. In order to prevent accidental enabling, only a pattern of 1010 will enable the trickle charger. All other patterns will disable the trickle charger. Preferred system embodiments powers up with the trickle charger disabled. The diode select (DS) bits (bits 2–3) select whether one diode or two diodes are electrically coupled between $V_{cc2}$ and $V_{cc1}$. If DS is 01, one diode is selected or if DS is 10, two diodes are selected. If DS is 00 or 11, the trickle charger is disabled independent of TCS. The RS bits (bits 0–1) select the resistor that is electrically coupled between $V_{cc2}$ and $V_{cc1}$. The resistor selected by the resistor select (RS) bits is as follows:

| RS Bits | Resistor | Typical Value |
|---------|----------|---------------|
| 00 | None | None |
| 01 | R1 | 2 KΩ |
| 10 | R2 | 4 KΩ |
| 11 | R3 | 8 KΩ |

If RS is 00, the trickle charger is disabled independent of TCS. Diode and resistor selection is determined by the user according to the maximum current desired for battery or super cap charging. The maximum charging current can be calculated as illustrated in the following example. Once again, as discussed above, assume that a system power supply of 5 V is applied to $V_{cc2}$ and a super cap is electrically coupled to $V_{cc1}$. Also assume that the trickle charger has been enabled with 1 diode and resistor R1 between $V_{cc2}$ and $V_{cc1}$. The maximum current $I_{max}$ would therefore be calculated as follows:

$$I_{max} = (5.0 \text{ V} - \text{diode drop})/R1$$
$$\sim (5.0 \text{ V} - 0.7 \text{ V})/2k\Omega$$
$$\sim 2.2 \text{ mA}$$

Obviously, as the super cap charges, the voltage drop between $V_{cc2}$ and $V_{cc1}$ will decrease and therefore the charge current will decrease.

CLOCK/CALENDAR BURST MODE

The clock/calendar command byte specifies burst mode operation. In this mode the first eight clock/calendar registers can be consecutively read or written (see FIG. 8A) starting with bit 0 of address 0.

If the write protect bit is set high when a write clock/calendar burst mode is specified, no data transfer will occur to any of the eight clock/calendar registers (this includes the control register). The trickle charger is not accessible in burst mode.

RAM

The static RAM is 31×8 bytes addressed consecutively in the RAM address space.

RAM BURST MODE

The RAM command byte specifies burst mode operation. In this mode, the 31 RAM registers can be consecutively read or written (see FIG. 8B) starting with bit 0 of address 0.

REGISTER SUMMARY

Figure 8B:
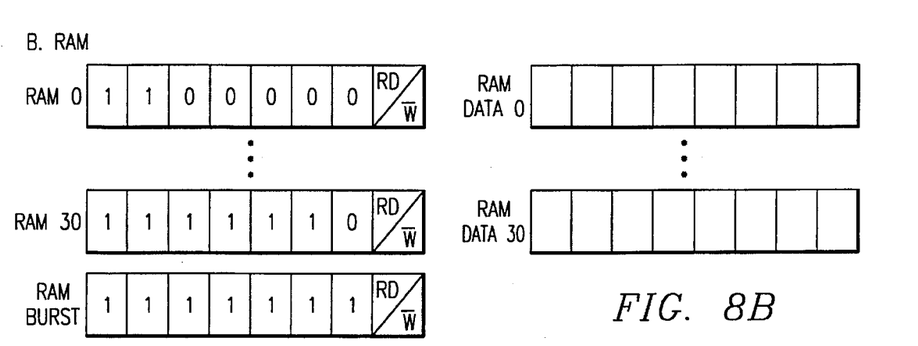

FIGS. 8A and 8B show the register address/definition for the clock and ram modes.

CRYSTAL SELECTION

A 32.768 kHz crystal, Daiwa Part No. DT26S, Seiko Part No. DS-VT-200 or equivalent, can be directly electrically coupled to the preferred system embodiments via pins 2 and 3 (X1, X2). The crystal selected for use should have a specified load capacitance (CL) of 6 pF. Crystals can be ordered-from Dallas Semiconductor (e.g., DS9032).

POWER CONTROL $V_{cc1}$ provides low power operation in single supply and battery operated systems as well as low power battery backup.

$V_{cc2}$ provides the primary power in dual supply systems where $V_{cc1}$ is electrically coupled to a backup source to maintain the time and data in the absence of primary power.

Preferred system embodiments will operate from the larger of $V_{cc1}$ or $V_{cc2}$. When $V_{cc2}$ is greater than $V_{cc1}$+0.02 V, $V_{cc2}$ will power preferred system embodiments. When $V_{cc2}$ is less than $V_{cc1}$, $V_{cc1}$ will power preferred system embodiments.

Figure 7:
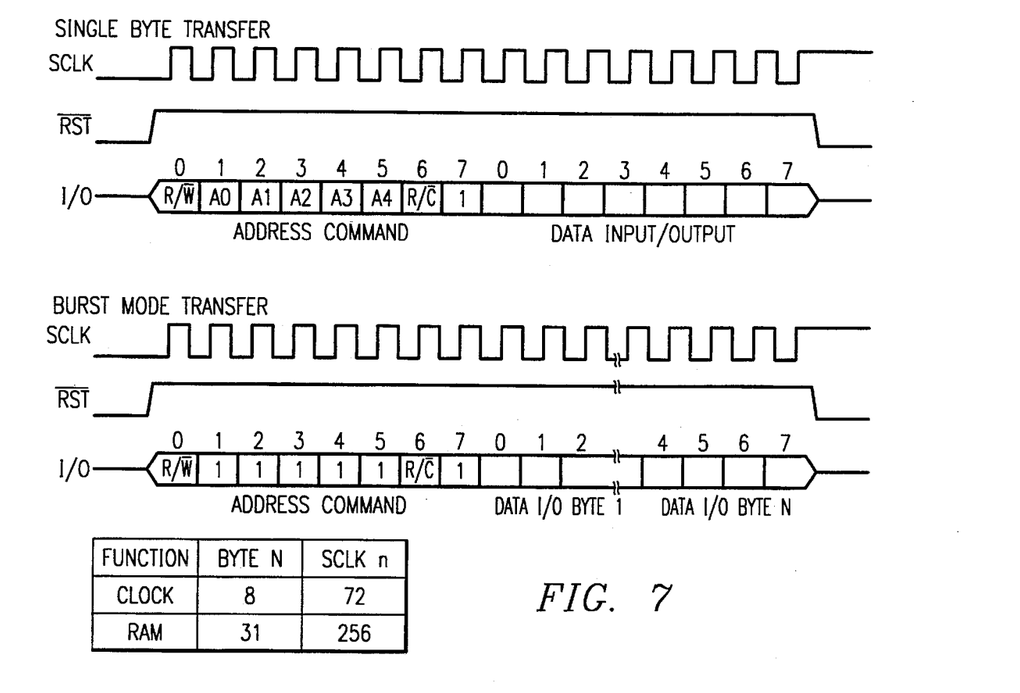
FIG. 7 is a series of timing diagrams showing the data transfer summary of preferred system applications.

FIG. 7 is a series of timing diagrams showing the data transfer summary of preferred system applications.

Appendix A includes information regarding the absolute maximum ratings, recommended DC operating conditions, DC electrical characteristics, capacitance, AC electrical characteristics, timing diagram: Read Data Transfer, Timing Diagram: Write Data Transfer, additional notes, and additional measurement information on the preferred application of a Serial Timekeeper 8-PIN DIP, 8-PIN SOIC package.

FURTHER MODIFICATIONS AND VARIATIONS

Although the invention has been described with reference to a specific embodiment, this description is not meant to be construed in a limiting sense. As described above, various modifications of the disclosed embodiment as well as alternate embodiments of the invention will become apparent to persons skilled in the art upon reference to the description of the invention. While it is clear from the above discussion that preferred embodiments implement the disclosed circuitry in an integrated circuit on a monolithic semiconductor substrate (e.g., silicon), portions of the circuitry may be moved "off-chip" depending upon the application and design requirements. For instance, resistor array 11 could be moved "off-chip" and addressed with multiple pins for any multitude of reasons, such as space is at a premium on the integrated circuit itself. In addition, diode combination 13 could be moved "off-chip" as well. Alternatively, a capacitor used as a rechargeable power supply could be moved "on-chip", so that only one external power supply pin would be needed. An "on-chip" capacitor may be combined with an "off-chip" second power supply (e.g., a capacitor or rechargeable battery). In fact, it is possible to have more than one chargeable power supply (e.g., capacitors positioned in parallel with one another). Similarly, while diode combination 13 is used to provide a necessary voltage drop(s), alternate components could be used as well, such as resistors, transistors, etc.). Alternate application circuitry may be coupled to the $V_{DD}$ pin, including alternate timekeeping circuitry or other application circuitry altogether. For instance, the programmable fields in the control register could be used to trigger or activate the isolation condition described in Lee et al. in U.S. Pat. No. #4,730,121, which was incorporated by reference hereinabove. In particular, the fields of the control register block 30 along with necessary circuitry could be used to activate the isolation mode disabled therein in place of or in addition to the reset signal. Accordingly, it should be understood that the modifications and variations suggested above are not intended to be exhaustive.

We claim:

1. A programmable power controller for controlling power between a first power source and a second power source and powering first circuitry, wherein said first power sources acts as a primary power source having a first voltage and said second power source having a second voltage comprising:

(a) a control register having a first field, said first field used to activate circuitry used to direct power from said primary power source to said second power source;

(b) circuitry to compare said first voltage and said second voltage to determine which is greater and to couple said primary power source or said second power source, depending on which is greater, to said first circuitry so as to provide power to said first circuitry; and wherein the there are at least three electrical paths from said first power source and further wherein said first path has a resistance of 2K Ω, said second path has a resistance of 4K Ω, and said third path has a resistance of 8K Ω.

2. A programmable power controller comprising:

a trickle charge circuit for providing a measured and controlled charge to a energy storage device;

means to couple said controller to a first power source for receiving power from said first power source;

means to couple said power controller to a second power source for receiving power therefrom;

means to couple said power controller to an external circuit to be powered comparator means for determining the amount of power consumed by said external circuit in relation to power available from said first power source;

register means contained within said power controller for providing a signal for controlling the coupling of said first power source to said external circuit and said trickle charger in response to output from said comparator means; and programming means for establishing a bit pattern in said register means such that said controlling of the bit pattern therein used to control said trickle charger and providing said signal for controlling such that a coupling between said primary power and said trickle charger is alterable.

3. A system as in claim 1 wherein said second power source is a super capacitor.

4. A system as in claim 1 wherein said second power source is a rechargeable battery.

5. A system as in claim 1 further comprising:

a means to detect the level of charge on said second power source and to reduce the power supplied thereto in response to said detected level.

* * * * *